United States Patent [19]

Graham

[11] 4,214,714
[45] Jul. 29, 1980

[54] APPARATUS FOR CUTTING FOOD

[75] Inventor: Elwood M. Graham, Ocean Springs, Miss.

[73] Assignee: M. H. Graham Corporation, Biloxi, Miss.

[21] Appl. No.: 933,683

[22] Filed: Aug. 15, 1978

[51] Int. Cl.² ............................................. B02C 18/22
[52] U.S. Cl. ................................. 241/93; 241/273.1; 241/285 A
[58] Field of Search ...................... 83/331, 332, 356.3, 83/607; 241/277, 280, 93, 94, 286, 285 R, 285 A, 85, 101.1, 273.1, 273.3; 144/174, 180

[56] References Cited

U.S. PATENT DOCUMENTS

| 686,421 | 11/1901 | Rote | 241/277 X |
|---|---|---|---|
| 2,685,902 | 8/1954 | Aberer | 241/93 X |

Primary Examiner—Mark Rosenbaum
Attorney, Agent, or Firm—Beveridge, DeGrandi, Kline and Lunsford

[57] ABSTRACT

A rotary conical cutter lies adjacent to the lower edge of a food-retaining hopper to grate, shred or slice food in the hopper. Cut food enters the center of the cutter through openings defined by cutting edges which project from the conical wall in the cutter. A set of interchangeable such cutters have cutting portions with cutting edges which project different distances from their cutter axes and from their respective walls. The lower edge of the hopper is movable to vary its distance from the cutter cones, and retaining means are provided for holding the lower edge of the hopper at an adjusted position proximate to the path of the cutting edges of the cutting portions.

8 Claims, 3 Drawing Figures

U.S. Patent    Jul. 29, 1980    4,214,714
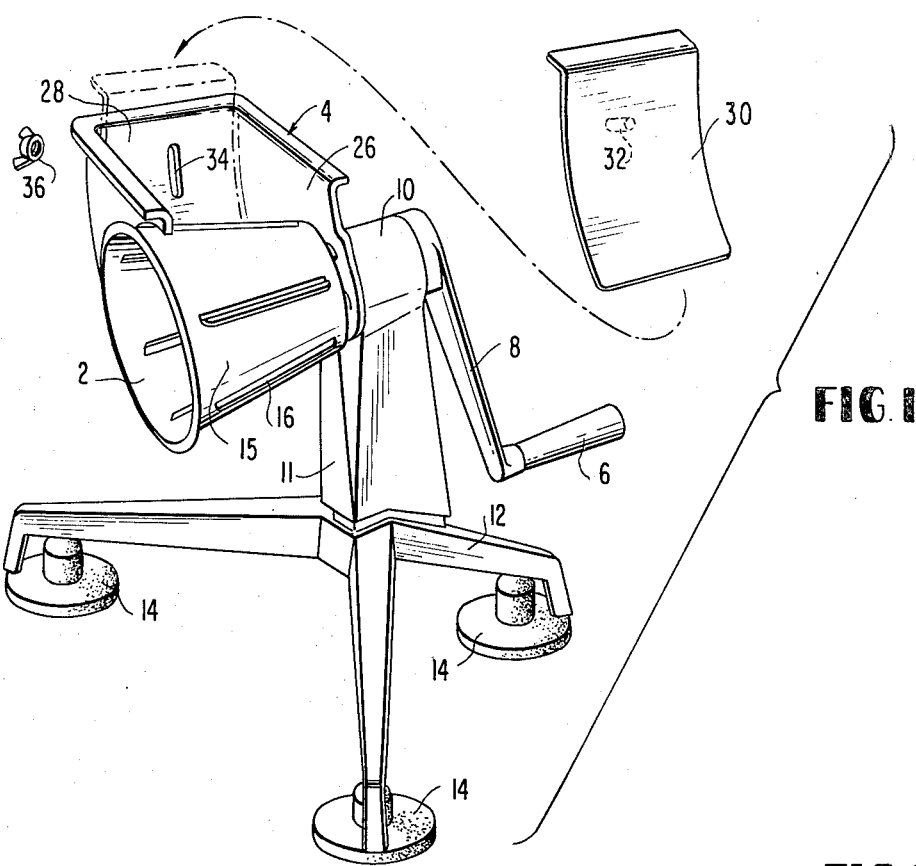
FIG. 1
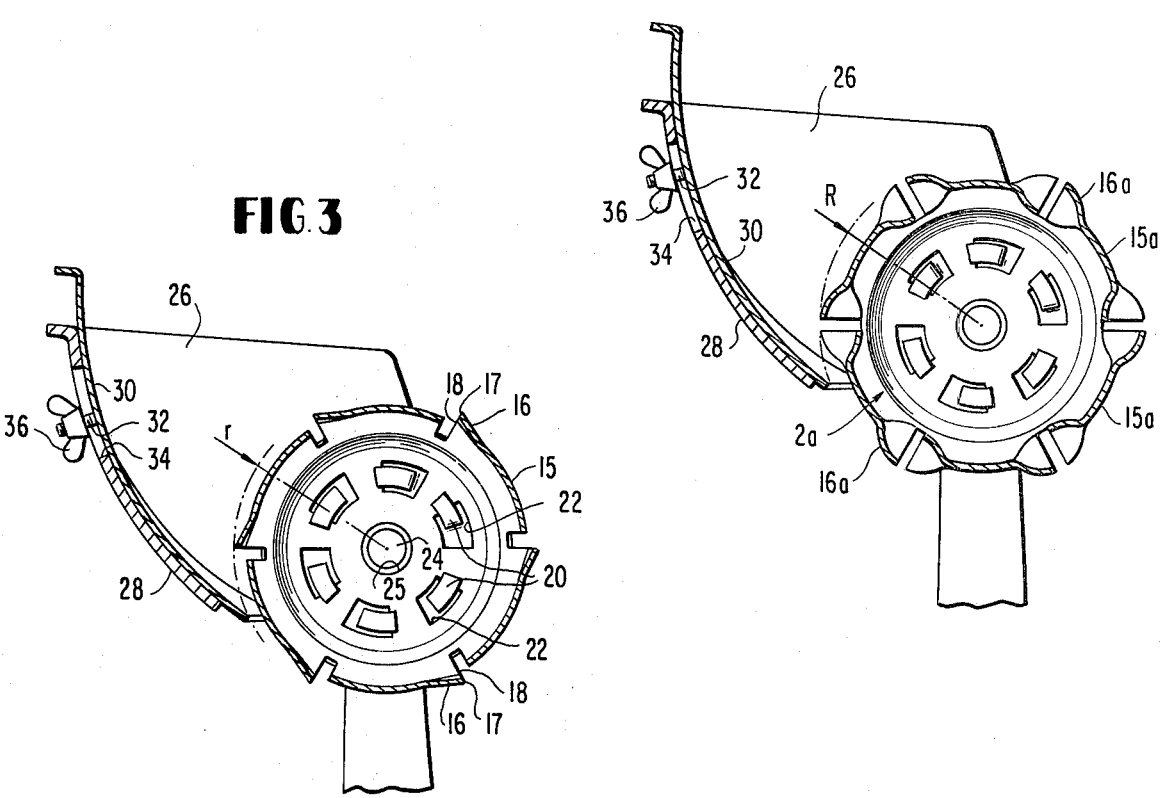
FIG. 2
FIG. 3

APPARATUS FOR CUTTING FOOD

BACKGROUND AND SUMMARY OF THE INVENTION

This invention relates to an improvement in existing food cutting apparatus wherein food held in a hopper is cut by rotary cutter cones, each cutter cone having a conical wall portion with projecting cutting portions. Each cutting portion has a sharp forwardly facing cutting edge which cuts material in the hopper, and a forwardly facing opening which enables such cut material to enter the interior of the conical cutter from which it ultimately falls.

Heretofore hoppers in such apparatus have had a stationary lower edge. The walls of the interchangeable conical cutters were all geometrically identical, but the cutting portions projecting from such walls varied in height from one cutter to another. With such construction, the gap between the cutting portions and the lower edge of the hopper would vary from cutter-to-cutter. When this gap became excessive, some material could pass between the lower edge of the hopper and the cutter. This is avoided by the present invention in which the improvement comprises a hopper having a lower edge which is movable to vary its distance from the cutter cones. Means are provided for holding the lower edge of the hopper at positions which lie proximate to the path of the cutting portions of the cutter cones mounted on the apparatus.

While the invention may take many forms, a preferred form thereof is illustrated in the accompanying drawings and described in the following portions of the specification.

BRIEF DESCRIPTION OF THE DRAWINGS

FIG. 1 is a partially exploded perspective view of an apparatus constructed according to a preferred embodiment of the invention, showing a conical food-slicing cutter mounted thereon;

FIG. 2 is a sectional view of an apparatus constructed according to the invention with a conical French fry cutter mounted thereon; and, FIG. 3 is similar to FIG. 2 except that it shows the food slicing cutter of FIG. 1 mounted in the apparatus.

BRIEF DESCRIPTION OF A PREFERRED EMBODIMENT

FIG. 1 shows a rotatably mounted conical cutter 2 for slicing food in a hopper 4. The cutter 2 is supported and rotated manually by a handle 6, a crank arm 8, a spindle which extends through a bearing in housing 10 and a mounting plate which detachably connects the cutter to the spindle. The hopper 4 and bearing housing 10 are formed of a single casting which also includes a vertical support post 11. The base 12 of the device is a three-legged casting with a short vertical post which fits telescopically into a corresponding recess in the lower end of post 11. Suction cups 14 on the base securely retain it in position on a kitchen counter or other support surface.

The sectional view of FIG. 3 shows that the conical wall 15 of cutter 2 is cut and formed to provide projecting cutting portions 16, each of which has a forwardly-facing cutting edge 17 defining a forwardly-facing opening 18. The edges 17 extend substantially the length of the cutter wall 15. Food cut by the edges 17 passes through the openings 18 into the hollow center of the cutter 2 and ultimately falls from the open end of cutter 2 into a bowl or other receptacle.

FIG. 3 also shows a known type of disengageable coupling between the cutter cone and the mounting plate of the crank-operated spindle. The mounting plate is generally flat and has a set of flat tabs 20 struck therefrom to engage the interior surface of the end wall of cone 2. These tabs 20 are smaller than apertures 22 on the end wall of the cutter, and they are slightly inclined relative to a plane which lies perpendicular to the rotational axis. A pin 24 on the mounting plate is received by a corresponding central hole 25 on the cutter end wall to establish and maintain concentricity. The cone is attached to the mounting plate by inserting the pin 24 and tabs 20 respectively through the holes 25 and 22 in the end wall of the cutter, and relatively rotating the elements until the tabs 20 bias the cutter end wall against the mounting plate.

As seen in FIG. 3, the hopper 4 has a stationary body which includes an end wall 26 and a curved wall 28 extending downwardly toward the cutter cone. The hopper also has a sliding plate 30 which conforms to the curvature of the interior surface of the curved wall 28. A stud 32 on the sliding plate extends through an elongated aperture 34 in the curved wall 28 of the hopper. A wing nut 36 located outside the hopper 4 is threadedly engaged on the stud 32 and, when tightened, bears against the exterior surface of the curved wall 28. The stud 32 and nut 36 thereby provide a retaining means for holding the sliding plate 30 in stationary position with respect to the stationary hopper body. As shown in FIG. 3, the sliding plate 30 has been adjusted and fixed in a position where its lower edge is close to the path followed by the cutting edges 17 of the cutter 2.

The significance of the improved hopper construction will be appreciated by referring to FIG. 2 which shows a different cutter cone 2a mounted on the apparatus for making French fries. Both cutter cones 2 and 2a have identical end walls and are similarly engaged with the crank-driven mounting plate. However, the cutter of FIG. 2 has sets of axially spaced cutting portions 16a extending from the conical wall 15a a greater distance than the cutting portions 16 in FIG. 3 whereby the outer radius R is greater than the corresponding radius r shown in FIG. 3. In prior devices, these differences produced a differing gap between the cutting portions and the lower edge of the hopper. However, as shown in FIG. 2, a substantially identical gap may be provided for both cutters simply by repositioning the sliding plate 30 of the hopper 4. As shown in FIG. 2, the sliding plate 30 is elevated somewhat for its FIG. 3 position, such elevation having been achieved simply by loosening the wing nut 36, moving the plate 30 upwardly and retightening the wing nut.

Persons familiar with this art will realize that a hopper may be constructed in a variety of ways to provide a movable cutter-confronting edge. Other means may be provided for adjusting the sliding edge, as by interchangeable plates attachable to the hopper. Since the advantageous results of this invention may be achieved by other equivalent structures, it is emphasized that the invention is not limited solely to the disclosed embodiment but is embracing of other structures which fall within the spirit of the following claims.

I claim:

1. A rotary food cutting apparatus comprising, a hopper for holding food to be cut, said hopper having a lower edge, means for rotationally supporting a cutter cone at a position which extends adjacent to the lower edge of the hopper, a set of interchangeable cutter cones including a first cutter cone and a second cutter cone each having a conical wall portion which is symmetrical with respect to a central axis, said cutter cones each being detachable from said cone-supporting means, and cutting portions projecting radially outwardly from said conical wall portion, each cutting portion providing a forwardly facing opening and a sharp forwardly facing cutting edge for cutting material in said hopper.

said wall portions of said cutter cones being substantially geometrically identical, said cutting portions of said first cutter cone projecting from their associated wall portion a distance which is less than the corresponding distance by which the cutting portions of said second cutter cone project from their respective conical wall portion, said first and second cones providing different depths of cut in that said forwardly facing openings on said first cutter cone have a height from their respective wall portion which is less than the corresponding height of the forwardly facing openings on said second cutter cone, the corresponding said cutting portions of said first and second cutter cones lying at different distances from their respective central axes, said lower edge of the hopper being movable to vary its distance from the cutter cones, means for retaining said lower edge of the hopper at positions which lie proximate to the path of the cutting portions of the cutter cone.

2. The rotary food cutter of claim 1 wherein the cutting edges of one of said cutter cones extends substantially the length of said conical wall portion.

3. The rotary food cutter of claim 1 wherein said cone-supporting means includes a central pin and a set of tabs, each of said cones having an end wall provided with apertures for receiving said central pin and tabs.

4. The rotary food cutter of claim 1 wherein said hopper includes a stationary body and a sliding plate, said lower edge of the hopper being the lower edge of the sliding plate.

5. The rotary food cutter of claim 4 wherein said stationary body of the hopper has an elongated opening, said sliding plate being located in said stationary hopper body, said retaining means including a threaded fastener extending through said elongated opening and connected to said plate.

6. The rotary food cutter of claim 5 wherein the cutting edges of one of said cutter cones extends substantially the length of said conical wall portion.

7. The rotary food cutter of claim 5 wherein said cone-supporting means includes a central pin and a set of tabs, each of said cones having an end wall provided with apertures for receiving said central pin and tabs.

8. The rotary food cutter of claim 7 wherein the cutting edges of one of said cutter cones extends substantially the length of said conical wall portion.

* * * * *